R. N. CHAMBERLAIN.
STORAGE BATTERY.
APPLICATION FILED OCT. 9, 1906.
929,121.
Patented July 27, 1909.
2 SHEETS—SHEET 1.
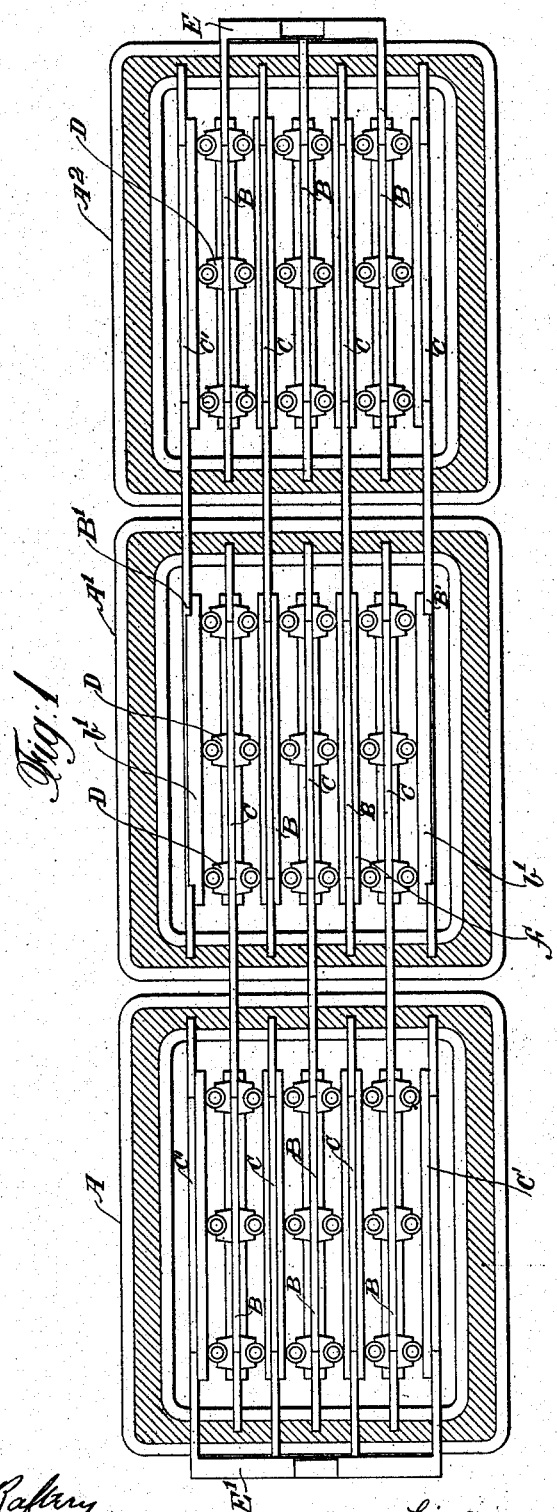

R. N. CHAMBERLAIN.
STORAGE BATTERY.
APPLICATION FILED OCT. 9, 1906.
929,121.
Patented July 27, 1909.
2 SHEETS—SHEET 2.
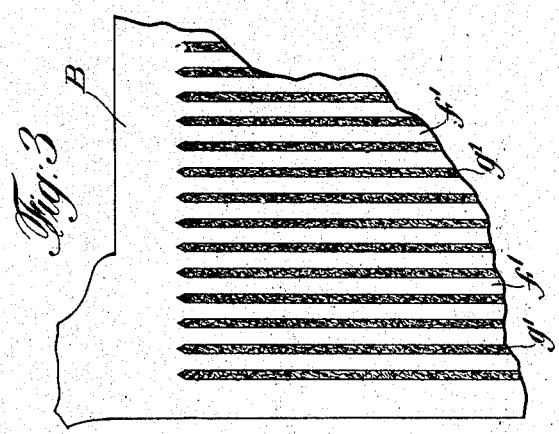
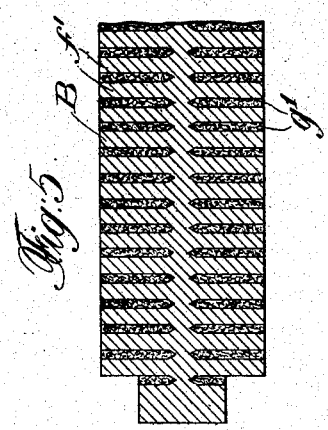
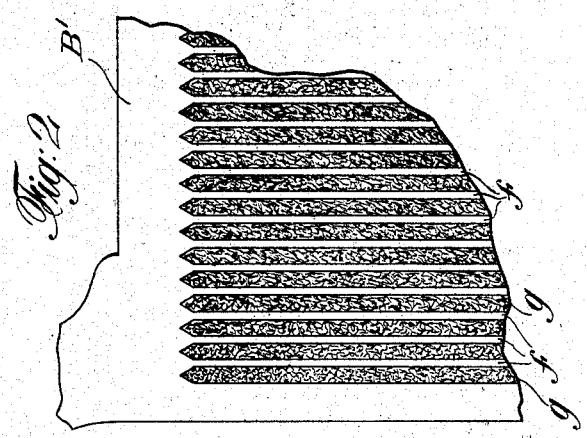
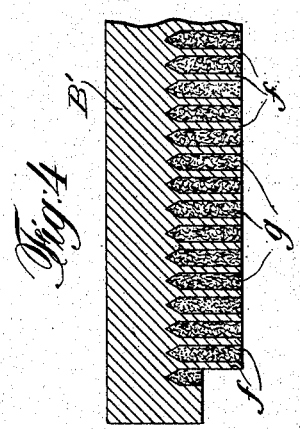

UNITED STATES PATENT OFFICE.

RUFUS N. CHAMBERLAIN, OF DEPEW, NEW YORK, ASSIGNOR TO GOULD STORAGE BATTERY COMPANY, A CORPORATION OF NEW YORK.

STORAGE BATTERY.

No. 929,121.  Specification of Letters Patent.  Patented July 27, 1909.

Application filed October 9, 1906. Serial No. 338,093.

*To all whom it may concern:*

Be it known that I, RUFUS N. CHAMBERLAIN, a citizen of the United States, and a resident of Depew, in the county of Erie and State of New York, have invented certain new and useful Improvements in Storage Batteries, of which the following is a specification.

My invention relates to storage batteries and has for its object such an arrangement or construction of a storage battery cell, especially of the usual type having lead plates, that the cells may be grouped together in series and operate efficiently while being cheaper to manufacture, to install and to maintain and more convenient in operation than any cells now known.

Storage battery cells are nearly always used in groups having a number of cells in series. The ordinary storage battery cell is provided with positives and negatives alternately arranged, the outer plates of the cell being negatives. Since the outer plates are acted upon on only one side they are ordinarily provided with active material only on the inside plate. In connecting different cells in series, the ordinary practice is to connect the various negatives of one cell to the various positives of the other cell and this must be done at the place where the batteries are to be installed, the connection being made by the expensive and difficult process of lead burning. After the group of cells in series have been thus connected the entire series of cells becomes in effect one integral device. No individual plate can be lifted out of the cell nor can the elements of one cell be removed therefrom for purposes of inspection or repair unless the plates of all the cells are simultaneously lifted, or unless the connections between adjoining cells are cut, thus requiring another lead burning operation.

It has been proposed to employ cells in which the plates are formed in couples so that the plates may be burned or cast together at the factory, simply slipping the couples into adjoining cells at the place where the battery is to be used. This would possess many and important advantages, eliminating all lead burning at the point of installation and permitting an unskilled attendant to examine the cells or remove or repair parts thereof with great ease, besides making the battery cheaper to manufacture, ship, install and maintain. Moreover, it would enable the action of the different cells to be equalized by redistribution of the plates and make it convenient to increase or decrease the number of cells in any installation at will. While, however, this construction of cells has been proposed, it has been found to be a disadvantageous one in practice. I have discovered that this general arrangement can be successfully employed thus obtaining the advantages I have above outlined without any offsetting disadvantages, provided that wherever the outside plate of the cell is a positive it is specially designed relative to the other positives of the cell with relation to the work required of the cell.

The arrangement of battery cells above referred to with plates formed in couples requires that the cells of the group shall alternately have outside negative plates and outside positive plates, because the negative plates of one set must be in series with the positive plates of the next, and with the plates thus built in pairs, the outside plate of one cell must be in series with the outside plate of the next. I have discovered that the disadvantageous operation of this type of battery is due to the one-sided action upon the outside positives of the alternate cells of the group which are much more seriously affected by this one sided action to which the outside plates are subjected than the outside negatives are. For this reason the outside positives tend to buckle or get out of parallelism with the other plates of the cell and their efficiency becomes destroyed with considerable rapidity. I have found that this difficulty can be removed by making the different positives of the cells having outside positives of substantially different capacity relative to the work that the cell is expected to do, the outside plates having an excessive capacity relative to the work which they are called upon to do, while the other positives have the normal capacity relative to the work which they are called upon to do. This additional capacity may be obtained in many specific ways according to the particular character of plates employed. I have found in practice that with a cell employing "spun" plates upon which the active material is formed Planté-wise, that entirely satisfactory results may be obtained by so grooving the outside and inside positives that the outside positive on its one active side will carry about as much active material as is carried on both sides of the inside positives. The result, therefore, is that the outside positive has substantially one hundred per cent. greater capacity than either side of the inside positives.

Referring to the drawings, Figure 1 shows the general arrangement of the cells that is made practical by my invention, the different relative capacities being diagrammatically indicated. Figs. 2 and 3 are greatly magnified portions of the face of an outside positive and an inside positive plate respectively. Figs. 4 and 5 show greatly magnified horizontal sections of portions of outside and inside positive plates.

A, A', A² represent three storage battery cells connected in series, it being understood that in the ordinary installation to which my invention would be applied there would generally be a much greater number of these cells.

B represent positive plates where the same are inside plates of the cell and therefore acted upon on both sides of the plate.

B' represent positive plates on the outside of the cell and therefore acted upon only on one side.

C and C' represent respectively inside and outside negative plates. These plates are separated in the ordinary way by separators D. At one end of the series the three positive plates B of the cell are connected together by the terminal E and at the other end the various negative plates of the cell are connected together by the terminal E'.

It will be noted that each outside negative C' of cell A² is directly connected with the corresponding outside positive plate B' of cell A' and that the intermediate negatives C of cell A² are each connected with corresponding intermediate positives B of the cell A'. The various negatives C of cell A' are each connected to a corresponding positive of the cell A. I have shown only three cells because that number is sufficient to illustrate all the methods of connection no matter how many cells there may be. If there are additional cells the two types of connection shown alternately continue throughout the series.

Because it is practically impossible to illustrate on a small scale the exact difference between the construction of the outside and the inside positives, I have not attempted in Fig. 1 to illustrate this feature except diagrammatically. I have merely indicated the relative amounts of active material on the various positives by reference to the projecting portions b, b', indicating that the projection b' on the active side of the outer positives is substantially twice the active material on each side of the inner plates. This I have indicated by making the projection b' about twice as wide as the projection b. The outer positives, therefore, each have substantially twice the capacity of either side of any of the inner positives.

One way of obtaining this result is shown in Figs. 2 to 5. Fig. 2 shows the active side of the outer positive plate b' and Fig. 4 shows a cross-section of the same. The plate is spun with ribs f extending beyond the original surface of the plate and forming grooves between them. These grooves are filled with active material g. The same construction is carried out in the inner positives B shown in Figs. 4 and 5, but in this case the ribs f' are wide, while the grooves carrying the active material g' are narrow. In the present instance the grooves f' are twice the width of the grooves f and as there are the same number per inch the grooves left in plate D are only one-half the width and therefore could contain but one-half of the active material, thus giving the plate B' substantially twice the capacity.

It will be understood that while I prefer to make the outer positives of substantially twice the capacity of either side of the inner positives, yet that this will be varied according to local conditions and the type of plate employed, the important feature being that the outer plate should have excessive capacity relative to that of the other plates of the cell, so that when the cell is used to its full capacity, so far as all the other plates are concerned, the outer positives will be working at far below their capacity. It will also be understood that the invention is applicable to other types of storage battery plates than those specifically shown in which the active material is formed Planté-wise on spun plates. There are numerous types and forms of lead plates for storage batteries in use and my invention may be applied to any of them.

Having thus described my invention, what I claim as new and desire to secure by Letters Patent is:

1. In a storage battery cell, a plurality of battery plates alternately positive and negative, an outside plate being a positive and having substantially greater capacity than either side of the inside positive plates of the cell.

2. In a storage battery cell, a plurality of positive plates having substantially different capacity per active side, those at the outside of the group having the greater capacity.

3. In a storage battery cell, an inside positive plate having active material on each side thereof, and outside positive plates having active material on one side of each, the outside positives being of substantially greater capacity than either side of the inside positive.

4. In a storage battery cell, an outside positive plate having substantially as much active material on the inside thereof as that carried by both sides of the inside positive plates of the same cell.

5. In a storage battery cell, a group of positive plates some having not materially less than the capacity of the others, those of greater capacity being on the outside of the group.

6. In a storage battery cell, an outside positive plate electrochemically formed on one side thereof and inside positive plates electrochemically formed on both sides thereof, the outside positive plate being formed with substantially as much active material on the inside as that formed on both sides of the inside positive plates.

7. In a storage battery cell, a group of electrochemically formed positive plates, some being formed to have substantially twice or more the capacity per active side of the others, those of greater capacity being on the outside of the group.

8. In a storage battery, a plurality of cells in series, alternate cells having outside positive plates, said outside positives being of excessive capacity per active side as compared with the other positives of the battery.

9. In a storage battery, a plurality of cells in series, alternate cells having outside positive plates, said outside positives having substantially twice or more the capacity per active side of the remaining positives of the battery.

10. In a storage battery, a plurality of cells in series having electrochemically formed plates, alternate cells having outside positive plates, said outside positives being formed to have excessive capacity per active side as compared with the other positives of the battery.

11. In a storage battery cell, a group of positive plates, the outer plates carrying active material on one side only while the inner plates carry active material on both sides, the amount of active material on the outer plate being not materially less than that on the inner plates.

12. In a storage battery cell, a plurality of electrochemically formed battery plates alternatively positive and negative, an outside plate being positive and being formed to have a substantially greater capacity per active side than are the inside positive plates of the cell.

In testimony whereof, I have signed my name to this specification, in the presence of two subscribing witnesses.

RUFUS N. CHAMBERLAIN.

Witnesses:
A. DALY,
EDWIN SEGER.